United States Patent [19]

Sakatos

[11] Patent Number: 4,922,369

[45] Date of Patent: * May 1, 1990

[54] CIRCUIT PROTECTOR

[75] Inventor: Michael J. Sakatos, Union, N.J.

[73] Assignee: Inresco, Inc., Manasquan, N.J.

[*] Notice: The portion of the term of this patent subsequent to Mar. 7, 2006 has been disclaimed.

[21] Appl. No.: 319,751

[22] Filed: Mar. 6, 1989

Related U.S. Application Data

[63] Continuation-in-part of Ser. No. 878,358, Jun. 25, 1986, Pat. No. 4,811,153.

[51] Int. Cl.$^5$ .......................... H02H 3/20; H01H 1/66
[52] U.S. Cl. ......................................... 361/88; 361/91; 361/102; 361/111; 361/117; 335/151; 335/154
[58] Field of Search ................... 361/33, 88, 117, 120, 361/56, 54, 91, 102, 187, 143, 154, 146, 206, 111; 307/116, 130; 335/154, 151

[56] References Cited

U.S. PATENT DOCUMENTS

| | | | |
|---|---|---|---|
| 3,056,868 | 10/1962 | Jacobson et al. | 335/151 X |
| 3,736,467 | 5/1973 | Meier et al. | 335/19 |
| 3,959,694 | 5/1976 | Walsh | 361/91 |
| 4,811,153 | 3/1989 | Sakatos | 335/151 X |

Primary Examiner—Todd E. De Boer
Attorney, Agent, or Firm—Robert M. Skolnik

[57] ABSTRACT

A magnetically operated circuit protector utilizing magnetizable reed contacts, primarily reed switches, in combination with a network of coil windings which results in positive trip and reset action, arc suppression, local and remote trip indication, overcurrent and overvoltage protection, operable in alternating and direct current systems, remote turn-on and turn-off, trip time of 50 to 100 microseconds, miniature size, automatic reset, and especially suitable for protecting sensitive electronic systems and instruments.

16 Claims, 5 Drawing Sheets

CIRCUIT PROTECTOR

CROSS-REFERENCE TO RELATED APPLICATIONS

This application is a continuation-in-part of U.S. patent application Ser. No. 878,358, filed Jun. 25, 1986 in the name of Michael J. Sakatos, now U.S. Pat. No. 4,811,153, issued Mar. 7, 1989.

FIELD OF THE INVENTION

This invention relates generally to magnetic circuit protecting devices, and, more particularly, to reed switch apparatus that includes a means to actuate and latch reed switches in response to a predetermined fault condition.

Description of the Prior Art

A reed switch is usually composed of two magnetizable and conductive flat metal reeds cantilevered inwardly toward each other glass to metal bonds at the ends of a surrounding tubular glass capsule. The leads also extend axially outward from the bonds of the capsule as conductive leads. The capsule forms an airtight seal around the reeds. The flat reeds are cantilevered so that flat surfaces on their interior ends face each other, but are separated by a gap.

Such a reed switch is actuated by an axial magnetic field which can be applied by a magnet or other means. This magnetizes the reeds enough so their interior ends are attracted and moved toward each other until contact is made. This type of switch is known as a Form-A reed switch.

Also available is a Form-C reed switch which utilizes three reed elements and performs a single-pole, double-throw switching function. The more common of these has a short non-magnetizable reed and also a short magnetizable reed sealed at one end of the glass capsule. A longer magnetizable reed, sealed in the opposite end has its flattened portion positioned between both reeds with one side resting against the fact of the non-magnetizable reed, effecting a normally closed contact.

Therefore, whenever the reed switch changes from a normal status to an operated status, the longer, more flexible reed breaks contact with the non-magnetizable reed and makes contact with the magnetizable reed by moving laterally from the former to the latter reed.

Other versions of the Form-C reed switch wherein all reed elements are magnetizable, are also applicable to this invention. The mode of operation of one of these switches is disclosed in the specification of U.S. Pat. No. 3,229,063 Issued Dec. 11, 1963 to Michael J. Sakatos.

SUMMARY OF THE INVENTION

The invention encompasses all types of reed switches in the versions to be depicted.

A characteristic of most Form-C reed switches which had probably precluded prior consideration for circuit protector use is the tendency of the movable contact to hesitate, or hang-up, between the normally closed and normally open contacts at some level of flux when exposed to a slowly increasing magnetic field. Additional flux is required for the reed to continue its travel to the opposite contact.

Prior to this invention, any attempt to utilize the normally closed contacts of a Form-C reed switch to interrupt the load current in response to the flux generated by a series connected sensing coil surrounding the switch would prove highly unsuccessful because, as the magnetic field reached the critical level, it would suddenly collapse as the transfer reed contact, series connected to the coil, began to open. The final result would likely be contact failure due to arcing as the movable reed "buzzer" open and closed.

Another characteristic of all reed switches is that after the reeds have been attracted to one another, a reduced magnetic field is sufficient to hold them in the actuated, or latched position because the poles formed at the reed ends are now very close and exhibit a stronger attractive force than when they are apart. The field must be reduced to a significantly lower value before the switch drops out, i.e., before the magnetic attraction between the interior reed ends is sufficient to overcome the stress forces that drive the reeds to their rest position.

This characteristic makes it possible to provide a magnetic field, between the pull-in value and the drop-out value, in the form of a permanent magnet or coil winding, which will latch the switch in the state of conduction into which it was last actuated. The advantage of this will become self evident from a review of the following detailed description of the invention.

At present, the only alternative to fuses for overcurrent protection of electronic equipment has been the magnetic circuit breaker, but its effectiveness has been questionable. One of the major limitations is the slow reaction time between sensing and the subsequent response to the fault. The prime cause of this is that circuit breakers generally comprise a plurality of electrical and mechanical parts (such as hinges, springs, linkages, etc.) all of which are called upon to function to accelerate contact opening and then latch the contacts in the open position.

It will be appreciated by those skilled in the art that the mass and inertia of these relay mechanisms introduce significant delay to the achievement of short operating times. It will also be appreciated that the increased friction due to wear of the actuating mechanism can lead to increased delay times and to instabilities.

The present invention accomplishes the protection with short operating time and with no wear to cause instabilities without resorting to auxiliary mechanisms.

The invention includes a new and improved circuit protector which has small size and high efficiency and an extremely fast operating time. An operating time of approximately fifty microseconds can be achieved. This is some two thousand times faster than the nominal one hundred millisecond magnetic circuit breaker. This fast response capability, even at low overloads, makes the invention more suited to protection of sensitive electronic instruments and equipment.

Accordingly, it is a general object of the invention to provide a new and improved magnetic circuit protector which overcomes the limitations of prior art devices.

It is another object of this invention to provide a new and improved magnetic circuit protector which can utilize a magnetic reed switch as the central operating mechanism to achieve a fault response time which is only a fraction of that for prior art protection devices as well as achieve reliable operation for millions of operations.

It is still another object of this invention to provide an electromagnetic coil around or in proximity to the reed switch capsule to effect its operation in response to the sensing of a predetermined level of current through the coil.

It is a further object of this invention to provide one or more electromagnetic coils and permanent magnets to latch the reed switch in the operated position.

It is an additional object of this invention to provide one or more permanent magnets to enhance or vary the operating characteristics of the circuit protector.

It is a further object of this invention to utilize Form-A and Form-C magnetic reed switches and electromagnetic coil windings interconnected so as to enable the reed contacts to be maintained in either the energized or de-energized state.

It is a still further object of this invention to provide a means of resetting the circuit protector either remotely or locally via means incorporated into the protection apparatus.

It is an additional object of this invention to provide a visible means of detecting that the circuit protector has been actuated.

It is still another object of this invention to provide a new and improved circuit protector, miniature in size, and capable of operating in microseconds, which is suitable for installation on printed circuit boards to protect sensitive electronic equipment and instruments.

It is yet another object of this invention to provide terminations to which a capacitor can be connected to provide a controlled time delay for the operating time of the circuit protector.

It is a further object of this invention to utilize more than one reed switch for the purpose of modifying the operating characteristics of the circuit protector.

It is still a further object of this invention to provide a means by which the circuit protector trip point can be altered before or after installation.

It is another object of this invention to provide a circuit protector which can be used in both alternating and direct current systems.

It is still another object of this invention to provide a circuit protector which will provide overvoltage protection.

It is another object of this invention to provide a single circuit protector which can protect against both overcurrent and overvoltage conditions.

It is yet another object of this invention to provide a circuit protector which is "trip-free" in that it cannot be reset if the original fault condition still exists.

It is a further object of this invention to provide a circuit protector which can be mounted on a panel or inserted into printed circuit boards which other electronic components.

It is a still further object of this invention to provide a circuit protector which can be set and reset from a remote location by a pulse signal emanating from a process controller or other device.

A further object of this invention is the provision of a circuit protector with an oppositely wound coil to provide an automatic reset capability in a circuit protector employing either a reed switch or an electro-mechanical switch.

BRIEF DESCRIPTION OF THE DRAWINGS

These and other objects and features of the invention may be more readily understood when the following detailed description is read with reference to the accompanying drawings in which.

Figure 1:
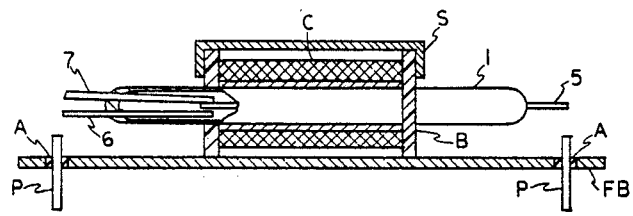
FIG. 1 is a cross-sectional view of one embodiment of the invention, comprising a coil and a Form-C reed switch.

Referring now to the drawings, and more particularly to FIG. 1 thereof, there is shown one illustrative embodiment of a circuit protector utilizing a Form-C reed switch constructed in accordance with the present invention.

The reed switch may contain mercury, be gas filled, pressurized, evacuated, or unsealed in the manner well known in the art.

In said FIG. 1, a magnetically responsive Form-C reed switch projects through the hollow inner portion of a plastic flanged bobbin B that supports a magnetic field forming coil C surrounding switch 1. Said coil C is composed of a dual winding; however, it may also be composed of any number of windings. An insulating flat rectangular base FB is provided to which bobbin C is secured and supported. Terminals P pass through and are secured to base FB with adhesive A. A magnetizable shield S secured to the top of bobbin B improves coil efficiency and prevents the magnetic field from coil C affecting or being affected by other items of equipment in a system within which the circuit protector is a part. A cover, not shown, may be used to enclosed the apparatus.

Figure 2:
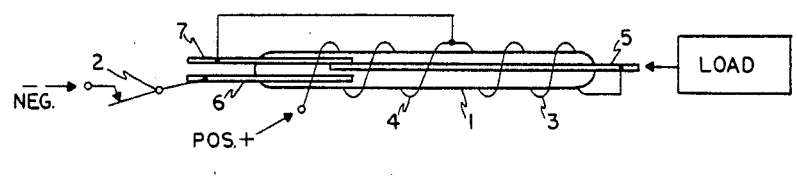
FIG. 2 illustrates a schematic manner, the magnetic circuit protector shown in FIG. 1, explaining the method of operation thereof.

FIG. 2 illustrates the embodiment of FIG. 1 is schematic form, connected as part of an electrical system. In this illustration, winding 4, which has a low electrical resistance, has one lead connected to one side of the power supply and the other lead connected to both the normally closed reed 7 and one lead of winding 3. The other lead of winding 3 is connected to the load to be protected and also to common reed 5. The normally open reed 6 is connected to the opposite polarity of the power supply through the terminal 2.

As the current through winding 4 reaches or exceeds a predetermined level, the magnetic field surrounding reed switch 1 becomes strong enough to actuate the switch. As the free end of flexible reed 5 begins to separate from reed 7, it interrupts the load current flowing from reed 7 to reed 5. Since winding 3 is connected across reeds 5 and 7, the load current is shifted through said winding, which has many turns and a high electrical resistance.

This technique serves a dual function: the presence of the winding across the reed contacts during the period of initial opening acts to suppress arcing which could produce voltage spikes harmful to associated electronic components, while at the same time, the strong magnetic field generated by said winding aids that of winding 4, causing the free end of reed 5 to be forcefully attracted to reed 6. Since reed 6 is connected to the negative side of the power supply via terminal 2, full voltage is impressed across the windings to latch reed switch 1 in the actuated state, while simultaneously grounding the load.

A time delay feature can be provided by connecting a capacitor across winding 4. Said delay will be a function of the capacitor value.

Figure 3:
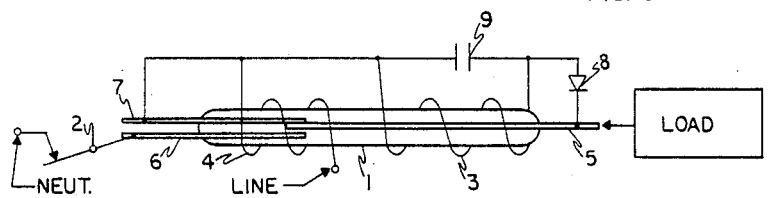
FIG. 3 shows a variation to make the embodiment shown in FIGS. 1 and 2 operable in alternating current systems.

FIG. 3 is a schematic illustration depicting a variation of the inventive concept of FIG. 2 to enable its use in both alternating and direct current application. The principle of operation is the same as that shown in FIG. 2. The modifications include the insertion of a diode 8 between one side of winding 3 and reed 5, and connecting a capacitor 9 in parallel with winding 3.

Referring again to FIG. 2, it has been shown that when the circuit protector has been tripped, said condition continues because reed switch 1 is latched in the operated state by the field generated by winding 3. However, said field would go through reversals and varying intensity if alternating voltage was impressed directly across winding 3. Connecting diode 8 and capacitor 9 as shown converts the alternating current to direct current in a manner well known in the art.

Figure 4:
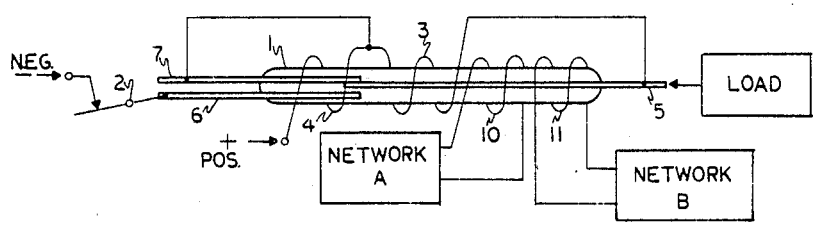
FIG. 4 illustrates a variant to trip or reset the circuit protector from a remote point.

FIG. 4 is a schematic variation of FIG. 2, wherein additional windings 10 and 11 have been added around reed switch 1. This modification enables the circuit protector to interrupt power to the load in response to a signal from one or more devices such as process controllers.

Figure 5:
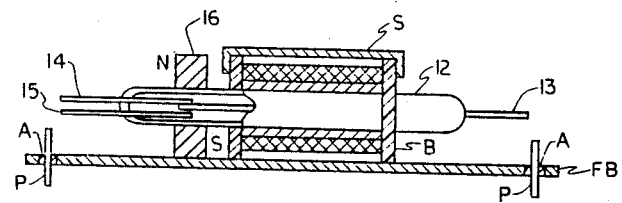
FIG. 5 is a cross-sectional view illustrating one method of positioning a latching magnet.

FIG. 5 illustrates a version wherein a permanent magnet has been added to the illustration shown in FIG. 1. The magnet can function to adjust the trip point of the circuit protector or latch the reed switch in the actuated position after tripping. A permanent magnet positioned adjacent to the reed switch can also perform this function.

Figure 6:
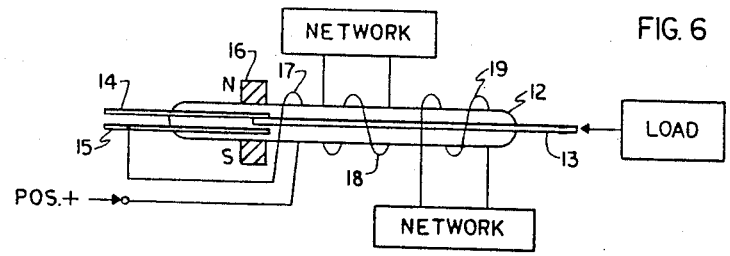
FIG. 6 is a schematic illustration explaining the operating mode of the variant shown in FIG. 5.

FIG. 6 is a schematic illustration of FIG. 5 wherein the function of magnet 16 is to latch reed switch 12 after being activated by the magnetic aiding field developed by winding 18 which has received a voltage pulse. Normally open reeds 13 and 15 of reed switch 12 are now closed and current begins to flow to the load from said contacts and series connected winding 17, wound to develop and opposing field. A third winding, 19, also wound to develop an opposing flux field, is used as an alternative method of allowing the reeds to drop out, thus disconnecting power to the load. A further method of achieving switch drop-out without resorting to a third winding, is to apply a momentary overload with a resistor or other component to winding 17. Reed 14 is an auxiliary contact suitable for grounding the load input circuit or for actuating a remote indication of the state of the circuit protector.

This version offers both circuit protection and load switching capability in response to electrical pulses from a remote source (such as a process controller).

Figure 7:
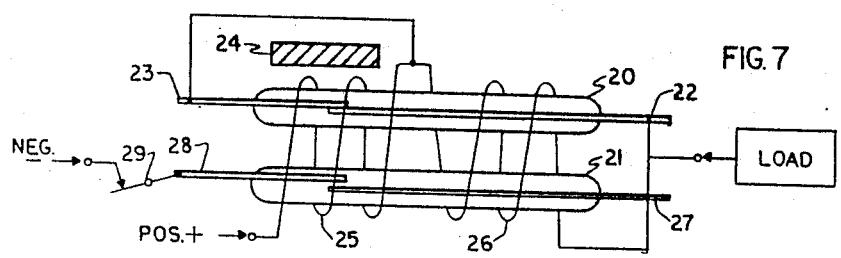
FIG. 7 is a schematic illustration of a variant wherein the Form-C reed switch has been replaced by two Form-A reed switches.

FIG. 7 is a schematic illustration of a version which is identical to FIG. 2 except that two Form-A switches, 20 and 21, have been substituted for a Form-C switch. The reeds, 22 and 23 of the switch 20 are actuated and held in a closed position by bias magnet 24. Winding 25 creates a magnetic field which opposes that of said bias magnet, and, at a predetermined current level, the new field will be sufficiently reduced to permit reeds 22 and 23 to reopen. This will interrupt the load current and increase the magnetic field by energizing winding 26. Thereupon, reeds 27 and 28 of switch 21 will close maintaining the current flow through windings 25 and 26, due to the connection of reed 28 to the negative side of the power supply via reset switch 29. The resetting and other features of FIG. 7 are identical to those shown in FIG. 2.

Figure 8:
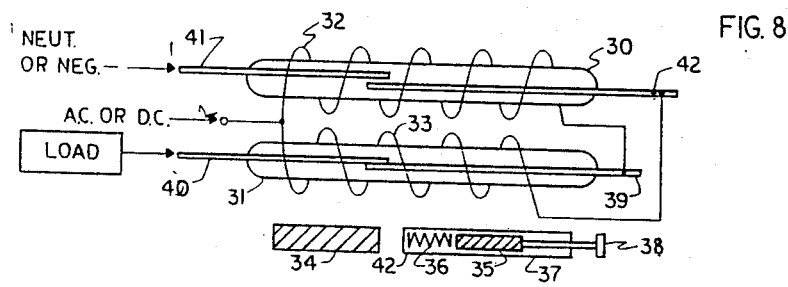
FIG. 8 is a schematic variant of the invention to increase its power handling capability.

FIG. 8 is a schematic illustration of a version that uses two Form-A reed switches 30 and 31, with individual coils 32 and 33 encircling each. Switch 30 is a low ampere-turn unit and is quite sensitive to the magnetic field developed by coil 32. Switch 31 is a higher ampere-turn switch, and thus can have special operating characteristics. One of these characteristics is higher power switching capabilities. Switch 31 is adjacent to latch magnet 34 and reset assembly 42 and consists of magnet 35, spring 36, housing 37 and pushbutton 38. The circuit protector is activated and power to the load initiated by pushing reset button 38 which moves field aiding magnet 35 closer to latch magnet 34. The combined magnetic field closes reed contacts 39 and 40 of adjacent switch 31. This permits current to flow from the power source through series connected winding 32 and said switch reeds to the load via reed 40.

At a predetermined level of current through the winding 32, reeds 41 and 42 of reed switch 30 will close, initiating the flow of current to winding 33 via reed 41 which is connected to the negative or neutral side of the power supply. The field of said winding opposes that of latch magnet 34, allowing reed contacts 39 and 40 to open and interrupt the load.

This version also lends itself to being turned on and off by a remotely generated input signal applied to additional coil windings (not shown) to aid or buck the adjacent latch magnet field.

Figure 9:
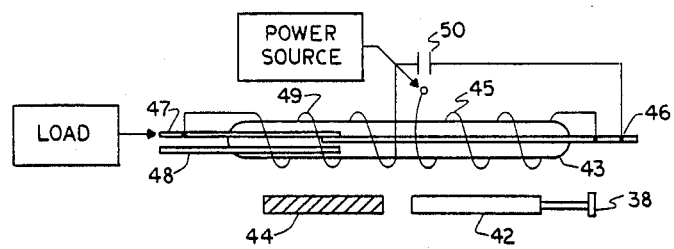
FIG. 9 is a variant of FIG. 2, illustrating the use of a latch magnet instead of a holding coil to retain the circuit protector in the tripped position.

FIG. 9 illustrates another version of the invention that utilizes a Form-C reed switch 43 and a latching magnet 44 to retain the switch in the actuated position after the circuit protector has been tripped. Operation is a similar to that illustrated in FIG. 2 wherein current to the load is connected through current sensing coil winding 45, and closed contacts 46 and 47. When the preset level of current flows through winding 45, the field causes reed 46 to be attracted to reed 48. As reed 46 leaves reed 47, the opening contacts force the current to redirect its path through winding 49 thereby charging capacitor 50. The network of capacitor 50 and winding 49 suppresses the inductive voltage spikes and provides a short pulse of magnetic aiding field to accelerate switch 43 into the latching state. Latching magnet 44 hold the reeds in this state until reset by assembly 42 as described in FIG. 8.

Figure 10:
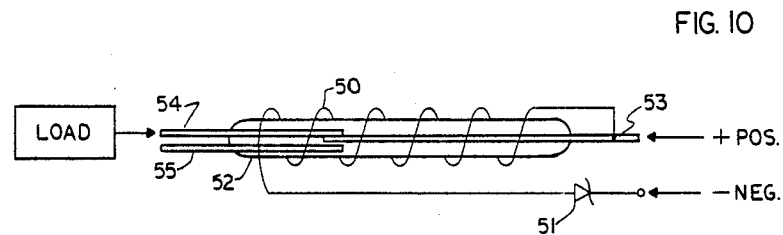
FIG. 10 is a schematic illustration of a variant to interrupt the load current when an overvoltage condition is detected, and then reset automatically.

FIG. 10 is a schematic illustration of the invention which is designed to sense and respond to an overvoltage condition. When the voltage impressed across the network of coil 50 and Zener diode 51 reaches or exceeds a predetermined level established mainly by the operating characteristics of said diode, the current through coil 50 magnetizes reed switch 52. This interrupts the load current which has been flowing through closed reeds 53 and 54. Reed 53 now makes contact with reed 55 which contact closure can be used to operate a remote device. When the over-voltage condition is no longer present, current flow through coil 50 ceases and the circuit protector automatically resets itself.

Using techniques well known in the art, the circuit protector invention can be modified to operated in both alternating and direct current systems. One method would be to use two or more Zener diodes connected back-to-back. Other non-linear resistive components or networks may be used in place of the Zener diodes.

Figure 11:
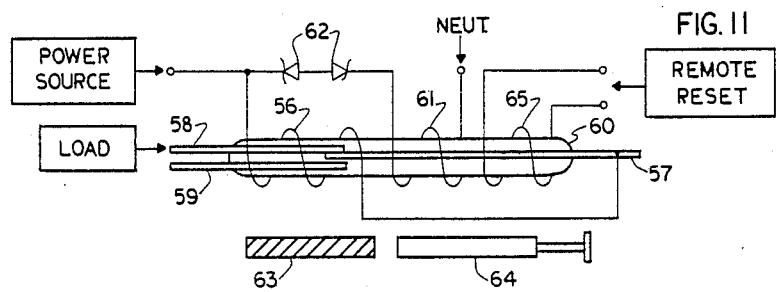
FIG. 11 is a variation of the invention comprising local and remote reset, trip indication and operating capability in both alternating and direct current systems.

FIG. 11 illustrates the embodiment of both current sensing and voltage sensing, and local and remote reset, in a schematic diagram as part of a system. In this showing, (the detailed functions of which having been previously described) are: coil winding 56 connected in series with closed reeds 57 and 58 between a power source and a load. This coil winding 56 is preset to activate reed switch 60 if an overcurrent situation develops. Coil winding 61, in series with back-to-back Zener diodes 62, will detect and respond to overvoltage conditions by developing a magnetic field which also activates reed switch 60. Latching magnet 63 will hold the switch in the tripped position until reset locally by reset magnet assembly 64, or by momentarily energizing winding 65 with a voltage pulse. In the tripped position, reed 59 which is connected to the power source through series connected winding 56, can be used to actuate an indicating device.

This embodiment of the invention will function in both alternating and direct current systems.

Figure 12:
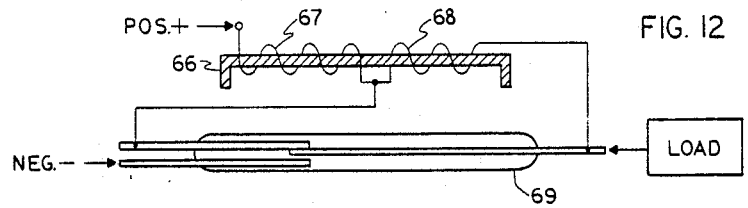
FIG. 12 is a schematic of a variant wherein a magnetizable core is used to magnetize the reed elements.

FIG. 12 is a schematic illustration of the invention demonstrating the embodiment of a magnetizable core 66 encircled by windings 67 and 68. Functionally, this version performs identically to the version of FIG. 2. The sole difference between FIG. 12 and FIG. 2 is that in FIG. 2, the windings encircle the magnetizable reeds to create magnetic poles, while in FIG. 12, said windings encircle a magnetizable core to create magnetic poles which poles, in turn, magnetize the reeds of switch 69.

It is therefor apparent that, though FIGS. 1-11 illustrate coil windings encircling the reed switches, said reed switches can be magnetized by a magnetizable core as illustrated in FIG. 12, or by other means known in the art.

Figure 13:
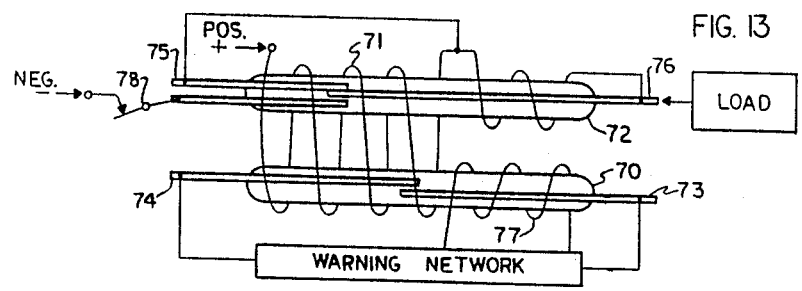
FIG. 13 is a variant wherein an advance warning signal is given to indicate that an overload condition is approaching the trip point of the circuit protector.

FIG. 13 illustrates another version of the invention in a system. This embodiment is similar to FIG. 2; however, a Form-A switch 70 is added. The function of switch 70 to send a signal to a network as an advance warning that the circuit protector is approaching its trip point.

In this embodiment, current sensing winding 71 encircles both reed switches 70 and 72. Switch 70 is more sensitive that switch 72 and its operating level is preset below that required to operate switch 72. Accordingly, as the current through winding 71 increases due to a malfunction in the load circuit, the magnetic field generated by said winding will reach a level at which reeds 73 and 74 will close, but reeds 75 and 76 will not open. The circuit network can act on the advance warning received from closed reeds 73 and 74 in a variety of manners including the ability to reopen said reeds after conditions have normalized. This can be accomplished by pulsing winding 77. Reset assembly 78 can restore all reeds to their normal state.

Figure 14:
FIG. 14 illustrates an embodiment of a magnetic assembly to adjust the trip point of the circuit protector.

FIG. 14 illustrates an embodiment of a magnetic assembly which can be utilized as an integral part of any of the foregoing embodiments of my invention. The function of this assembly is to enable the trip point of the circuit protector to be varied after it has been fabricated. The adjustment can be made in the factory or can be fine tuned by the user after the circuit protector is installed in the electrical circuit. The trip point may be varied by rotating screw 79 in the threaded end of the housing 80. This advances or retracts the magnet 81 in contact with spring 82 which serves to aid or buck the flux generated by the sensing coil.

Figure 15:
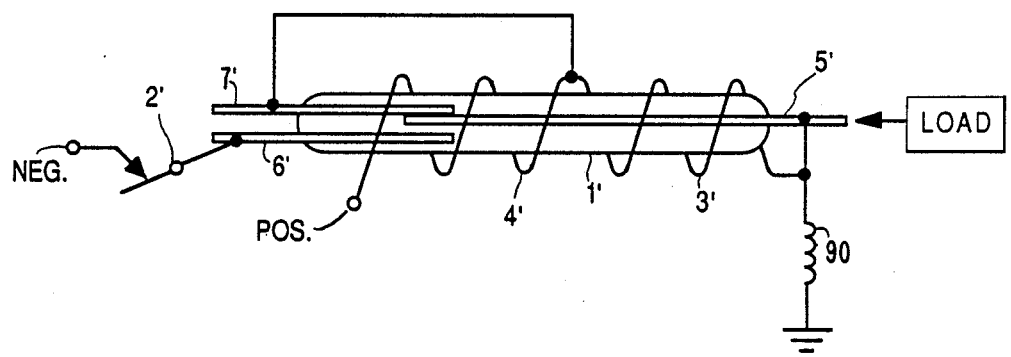
FIG. 15 is a schematic diagram of a modification of the circuit of FIG. 2.

FIG. 15 is a schematic diagram of a modification to the circuit of FIG. 2. In FIG. 15, one end of a coil 90 is grounded with the other end of coil 90 connected to coil 3' and to moveable contact 5' of reed switch 1'. Coil 90 is wound to generate flux in opposition to the flux generated in coil 3'. The coils 3' and 90 are wound such that the flux generated by the combined opposing coils is just enough above the drop out voltage of the reed switch (i.e. approximately 10% above the drop out voltage) to maintain the switch in its tripped or operated state.

In operation, the effect of coil 90 as a control means is such as to increase its flux level approximately in proportion to the recovery of the load from its abnormal condition to the point where near or at normal load conditions, the flux generated by coil 90 will result in a combined net flux which will permit the switch 1' to reach the drop-out point and the switch 1' will reset.

I claim:

1. A magnetically operated circuit protector having trip and reset action comprising: at least two electromagnetic coil windings for generating aiding magnetic fields; at least two magnetizable elements each of which has a contacting portion thereon; means for supporting said elements so that the contact portions overlap; means including one of said coil windings for inducing lines of flux through said elements to cause said elements to initiate a switching function; means including another of said coil windings to complete said switching function causing said elements to assume a switched state and to release said elements from the switched state; said switching being induced on the occurrence of a predetermined condition.

2. The protector of claim 1 further including means connected to said circuit protector to provide an indication of the status of said elements.

3. The circuit protector of claim 1 wherein said flux inducing means includes a magnetic core coupled to said coil windings.

4. The circuit protector of claim 1 wherein said flux inducing means includes said coil windings mounted such that they encircle said magnetizable elements.

5. The circuit protector of claim 1 wherein said magnetizable elements include at least two normally open contacting portions and biasing means magnetically coupled to said elements for holding said contacts in their closed position.

6. The circuit protector of claim 1 further including additional control means magnetically coupled to said elements for activating and deactivating said protector.

7. The protector of claim 6 wherein said control means includes at least one additional electromagnetic coil encircling said elements.

8. The device of claim 1 wherein one of said electromagnetic coil windings includes at least two coils, one of said coils being formed such that it produces a magnetic field which is different from the field produced by the other coil.

9. The circuit protector of claim 1 further including delay means connected to said coil windings for generating a delay time for operation of said protector.

10. A circuit protector comprising: a first terminal for connecting said protector to a power source; a second terminal for connecting said protector to a load; a magnetic Form-C reed switch having two fixed elements and one moveable element for contacting either of said fixed elements; two electromagnetic coil windings connected in series, one of said coils coupled for initiating the switching of said reed switch on the occurrence of an overcurrent condition, one of said windings being connected across said first terminal and a first of said fixed elements; said moveable contact of said reed switch being connected to said second terminal; the other of said coil windings being connected to said moveable contact of said reed switch and to said first fixed element for completing the switching of and retaining said reed switch in its switched state; and a third coil winding connected to said moveable element across said second terminal for causing said reed switch to return to an unswitched state as said overcurrent condition is reduced.

11. The protector of claim 10 further including control means coupled to said elements for generating electrical signals to switch said elements.

12. The protector of claim 10 wherein said coils produce different magnetic fields.

13. A magnetically operated circuit protector comprising an input terminal and an output terminal; a Form-C reed switch having a moveable contact and two fixed contacts, one of said fixed contacts being normally closed; a first electromagnetic coil connected across said normally closed fixed contact and said input terminal; a second electromagnetic coil connected in series with said first coil across said normally closed fixed contact and said moveable contact and to said output terminal, said first coil initiating the switching of said contacts and said second coil completing said switching and maintaining said contacts in the switched state; and a third coil connected across said moveable contact and to said output terminal for causing said switch to return to its unswitched state.

14. A circuit protector comprising: a first terminal for connecting said protector to a power source; a second terminal for connecting said protector to a load; a magnetic Form-C reed switch having two fixed elements and one moveable element for contacting either of said fixed elements; one of said fixed elements being normally closed; first, second and third coil windings; said first coil winding generating a trigger flux for actuating said reed switch on the occurrence of an overcurrent condition and being connected across said first terminal and said normally closed fixed element; said moveable contact of said reed switch being connected to said second terminal; said second coil winding generating a holding flux and being connected to said moveable contact of said reed switch and to said normally closed fixed element for retaining said reed switch in its switched state, said trigger flux aiding said holding flux; said third winding being connected to said moveable contact and to said second terminal for generating a flux in opposition to said holding flux.

15. The protector of claim 13 wherein the other of said fixed contacts is coupled to a third terminal for connecting said protector to ground or to an indicator.

16. The protector of claim 14 further including third terminal means coupled to the other of said fixed elements for connecting said protector to other points.

* * * * *